(12) United States Patent
Zavadskyi et al.

(10) Patent No.: US 12,198,391 B2
(45) Date of Patent: Jan. 14, 2025

(54) INFORMATION COMPRESSION METHOD AND APPARATUS

(71) Applicant: Zibra AI, Inc., Lewes, DE (US)

(72) Inventors: Vladyslav Zavadskyi, Kyiv (UA); Tetiana Martyniuk, Chernivtsi (UA)

(73) Assignee: Zibra AI, Inc., Lewes, DE (US)

( * ) Notice: Subject to any disclaimer, the term of this patent is extended or adjusted under 35 U.S.C. 154(b) by 434 days.

(21) Appl. No.: 17/748,418

(22) Filed: May 19, 2022

(65) Prior Publication Data
US 2022/0375135 A1 Nov. 24, 2022

Related U.S. Application Data

(60) Provisional application No. 63/201,919, filed on May 19, 2021.

(51) Int. Cl.
*G06T 9/00* (2006.01)
*G06T 7/11* (2017.01)
*G06T 19/20* (2011.01)
*G06T 3/00* (2006.01)

(52) U.S. Cl.
CPC ............... *G06T 9/001* (2013.01); *G06T 7/11* (2017.01); *G06T 19/20* (2013.01); *G06T 3/00* (2013.01); *G06T 2207/20021* (2013.01); *G06T 2207/20081* (2013.01); *G06T 2219/2016* (2013.01)

(58) Field of Classification Search
None
See application file for complete search history.

(56) References Cited

U.S. PATENT DOCUMENTS

2005/0018916 A1* 1/2005 Kondo .................. G06T 3/4015
375/E7.188

* cited by examiner

*Primary Examiner* — Haris Sabah
(74) *Attorney, Agent, or Firm* — FITCH EVEN TABIN & FLANNERY, LLP

(57) ABSTRACT

A control circuit facilitates compressing source field information (such as, for example, information that comprises a scalar field and or a vector field) having a corresponding initial space for a given object into a corresponding compact representation. That source field information may comprise a three-dimensional object represented as a two-dimensional manifold embedded in Euclidean three-dimensional space approximated via polygon mesh. This can comprise subdividing the initial space into a plurality of subspaces and generating a fixed-dimensionality vector representation for each field that corresponds to one of the subspaces. These teachings can then provide for inputting the fixed-dimensionality vector representations and query point coordinates corresponding to each of the subspaces to a field estimator neural network (such as, but not limited to, a neural network configured as an encoder-decoder machine learning model) trained to output corresponding field values.

18 Claims, 5 Drawing Sheets

INFORMATION COMPRESSION METHOD AND APPARATUS

RELATED APPLICATION(S)

This application claims the benefit of U.S. Provisional application No. 63/201,919, filed May 19, 2021, which is incorporated by reference in its entirety herein.

TECHNICAL FIELD

These teachings relate generally to information compression.

BACKGROUND

Computer-based processing is used to effect image-based processing of various kinds. In some cases, the underlying data and/or the processing involved outstrips the ability of the computing platform to effect the desired results within a desired window of time and/or within the available memory resources. This can be particularly so when the application setting deals with three-dimensional model representations, image rendering, processing to achieve a particular lighting effect, approximating physical interactions of a three-dimensional point-to-object via approximation of a three-dimensional model's signed distance field, and so forth.

BRIEF DESCRIPTION OF THE DRAWINGS

The above needs are at least partially met through provision of the information compression apparatus and method described in the following detailed description, particularly when studied in conjunction with the drawings, wherein.

Figure 1:
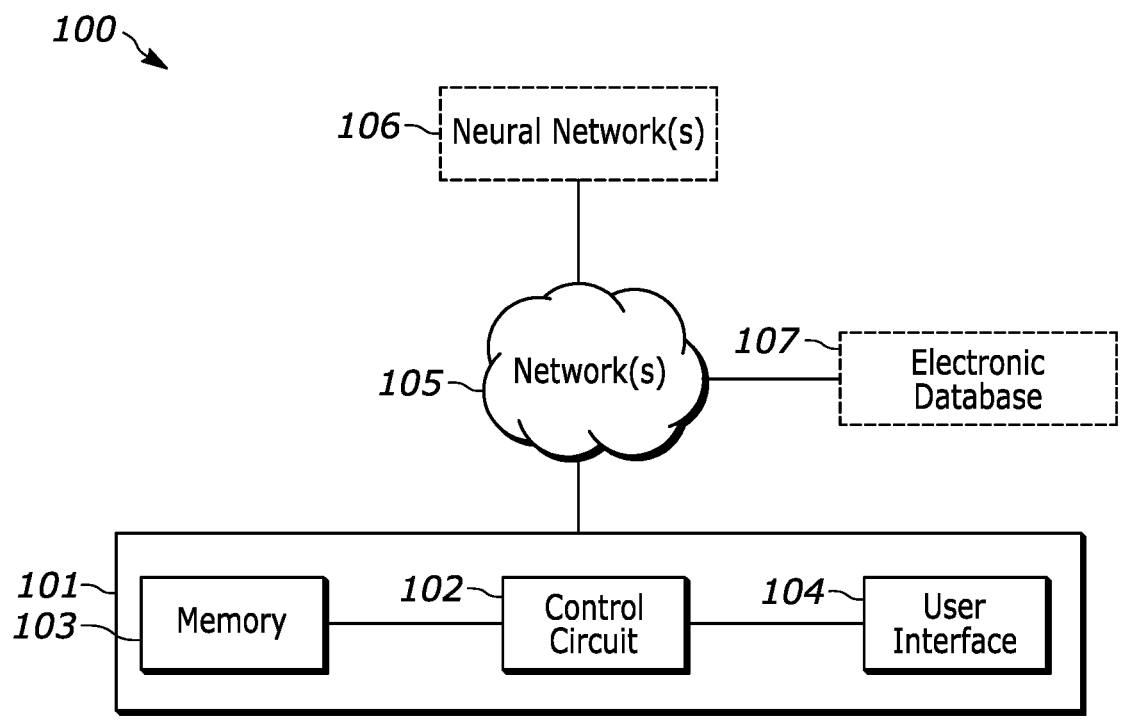
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments, a control circuit facilitates compressing source field information (such as, for example, information that comprises a scalar field and or a vector field) having a corresponding initial space for a given object into a corresponding compact representation. That source field information may comprise, for example, a (signed) distance field to a three-dimensional object represented as a two-dimensional manifold embedded in Euclidean space. This can comprise subdividing the initial space into a plurality of subspaces and generating a fixed-dimensionality vector representation for each field that corresponds to one of the subspaces. These teachings can then provide for inputting the fixed-dimensionality vector representations and query point coordinates corresponding to each of the subspaces to a field estimator neural network (such as, but not limited to, a neural network configured as an encoder-decoder machine learning model) trained to output corresponding field values.

The aforementioned subspaces may comprise geometric primitives such as a sphere or a cube. By one approach, all of the subspaces constitute only a single geometric primitive category; for example, all of the subspaces may only constitute spheres. By another approach, the subspaces may represent a heterogeneous collection of differing geometric primitive categories. For example, the aforementioned subspaces may comprise various geometric primitives (such as both spheres and cubes) or more complex shapes functioning as bounding volumes.

Subdividing the initial space into a plurality of subspaces may comprise, for example, generating a point set comprising a fixed set of points and then generating at least one descriptor for each of the points. These teachings can then serve to provide those descriptors as input to at least one of an analytic algorithm and a machine learning model trained as a spatial decomposer that outputs corresponding subspace parameters to the plurality of subspaces. By one approach, the aforementioned subspace parameters may include center positions and defining parameters of corresponding subspaces that are represented by geometric primitives.

Generating the fixed-dimensionality vector representation for each field that corresponds to one of the subspaces may comprise, for example, identifying kernel points within each of the subspaces. Field values can then be calculated at positions defined by those kernel points for each subspace and those field values then combined to generate descriptors for each of the subspaces.

When the aforementioned field estimator neural network comprises an encoder-decoder machine learning model, by one approach the encoder portion thereof can learn representations of field variation specifics within a subspace and a decoder portion thereof serves to estimate field values at each of a plurality of corresponding coordinate points.

So configured, memory requirements and/or computational complexity can be greatly reduced without compromising the quality of the desired computer science activity such as, but not limited to, physics simulations, image-based processing, and so forth. This, in turn, can permit desired results to be achieved with general computing platforms instead of higher-cost platforms.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a computing device 101 that itself includes a control circuit 102. Being a "circuit," the control circuit 102 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

In this example the control circuit 102 operably couples to a memory 103. This memory 102 may be integral to the control circuit 102 or can be physically discrete (in whole or in part) from the control circuit 102 as desired. This memory 103 can also be local with respect to the control circuit 102 (where, for example, both share a common circuit board, chassis, power supply, and/or housing) or can be partially or wholly remote with respect to the control circuit 102 (where, for example, the memory 103 is physically located in another facility, metropolitan area, or even country as compared to the control circuit 102). It will also be understood that this memory 103 may comprise a plurality of physically discrete memories that, in the aggregate, store the pertinent information that corresponds to these teachings.

In addition to the aforementioned source field information, this memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In the illustrated approach, the control circuit 102 also operably couples to a user interface 104. This user interface 104 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

Also this example, the control circuit 102 operably couples to one or more networks. Various data communications networks are well known in the art, including both wireless and non-wireless approaches. As the present teachings are not overly sensitive to any particular selections in these regards, further elaboration regarding such networks is not provided here for the sake of brevity. So configured, the control circuit 102 can communicate with any of a variety of remote network elements including, for example, one or more neural networks 106 and/or electronic databases 107 as discussed below.

Figure 2:
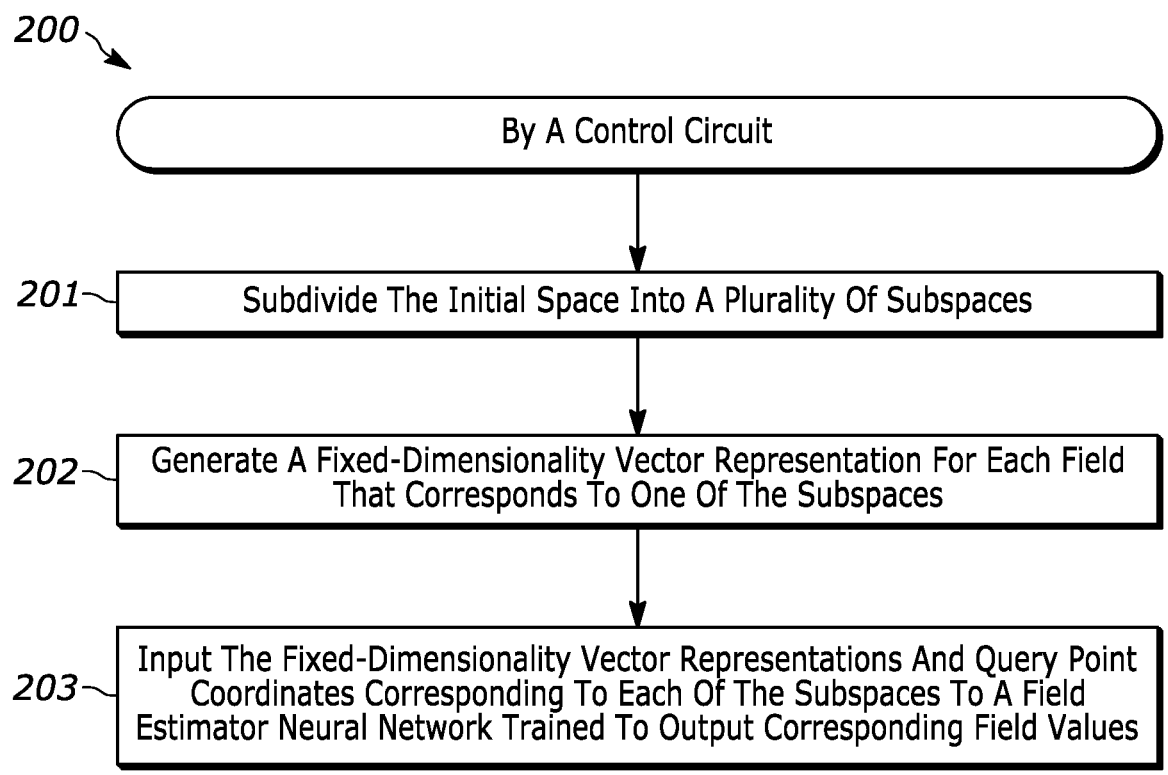
FIG. 2 comprises a flow diagram as configured in accordance with various embodiments of these teachings.

FIG. 2 presents a process 200 that can be carried out by the aforementioned apparatus, and in particular the aforementioned control circuit 102. In this illustrative example the process 200 serves to compress source field information having a corresponding initial space for a given object into a corresponding compact representation. That source field information may comprise at least one of a scalar field and a vector field. A scalar field comprises a function of coordinates in space whose value at each point is a scalar value. A vector field comprises a function of coordinates in space whose value at each point is a vector. For example, in a computer graphics application setting, a vector value at a given point may represent a color value, a translucency value, a radiance emissiveness value, and so forth.

For the sake of an illustrative example, and without suggesting any limitations in these regards, the source field information will be presumed to comprise a signed distance field towards a three-dimensional object represented by a polygon mesh. Such a representation is understood in the art and requires no further elaboration here aside from noting that a three-dimensional polygon mesh comprises a collection of polygons, such as triangles, in three-dimensional space that are connected one to another in order to represent a three-dimensional object's surface.

Figure 3:
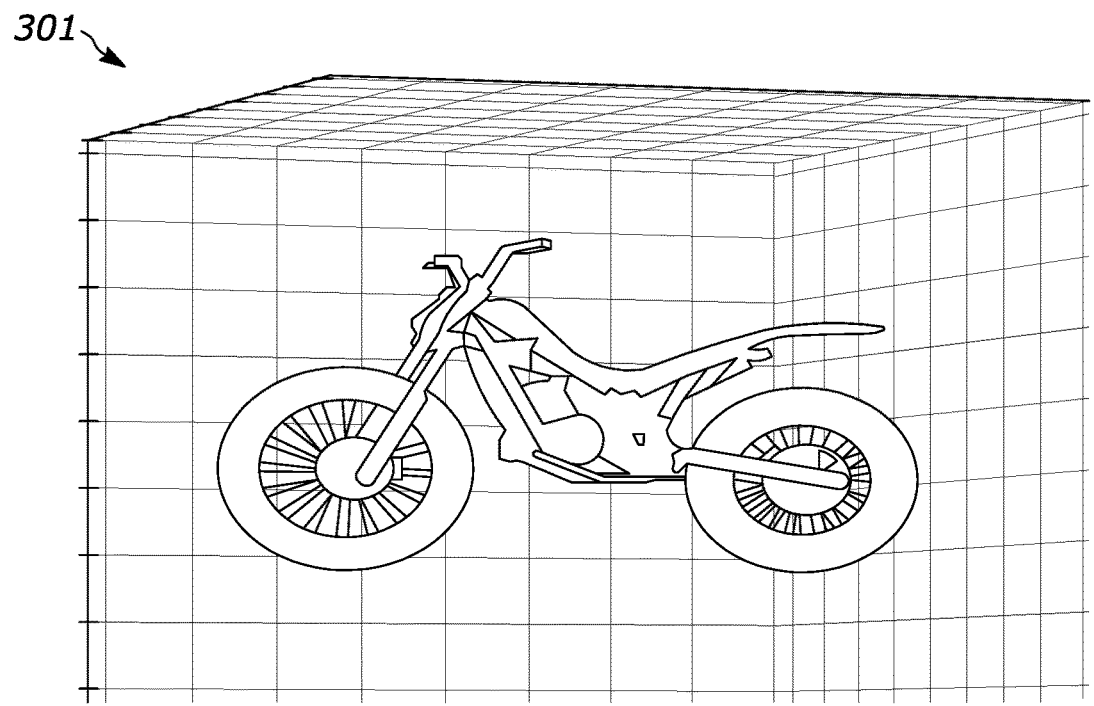
FIG. 3 comprises graphical depictions as configured in accordance with various embodiments of these teachings.
Figure 3:
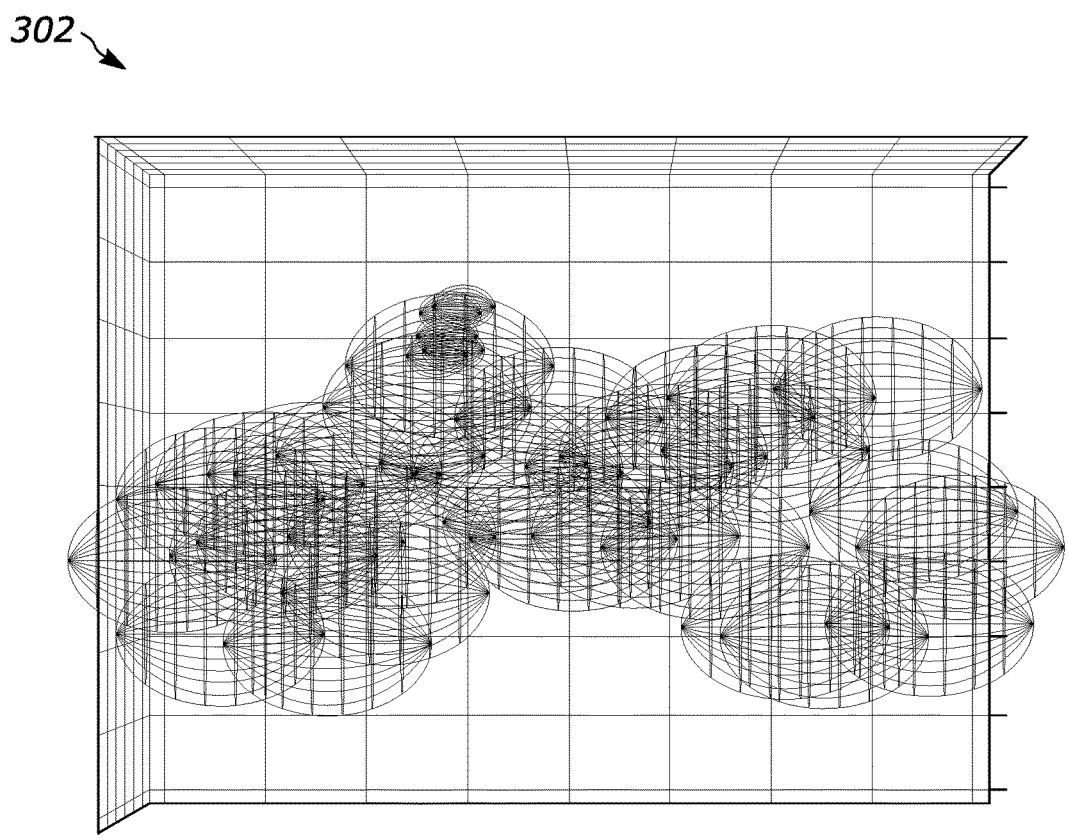

At block 201, this process 200 provides for subdividing the aforementioned initial space into a plurality of subspaces. By one approach, some or all of these subspaces comprise geometric primitives, such as a sphere or cube. These subspaces may all have an identical size or at least some may differ in size from others. FIG. 3 presents an illustrative example in these regards, where a three-dimensional image of a motorcycle 301 is subdivided into a plurality of differently-sized spheres as depicted at reference 302.

By one approach, subdividing that initial space into the aforementioned plurality of subspaces can comprise generating a point set comprising a fixed set of points. By one approach, that fixed set of points can be selected/generated so as to correspond to the most meaningful information about the source field data. In a case involving mesh-induced signed distance fields, these geometric primitives that serve as meaningful subspaces of three-dimensional space can be spheres or access aligned bounding boxes (AABB), but these teachings will accommodate other approaches including, but not limited to, oriented bounding boxes (OBB), discrete oriented polytopes (k-DOP), and so forth.

It will be appreciated that this subdivision of the three-dimensional space serves to reduce the number of possible field variations and to otherwise make the task at hand tractable for learning with a neural network.

Next, this subdivision activity can comprise generating at least one descriptor for each of the aforementioned points. By one approach, those generated descriptors can comprise accordance within, for example, a Euclidean context.

And next, the aforementioned descriptors can be provided as input to an analytic algorithm and/or a machine learning model that was trained as, for example, a spatial decomposer. The resultant output comprises subspace parameters that correspond to the plurality of subspaces. As one illustrative example in these regards, such subspace parameters can include center positions and other defining parameters (such as a radius metric) of corresponding subspaces that are represented by the aforementioned geometric primitives.

At block 202, this process 200 generates a fixed-dimensionality vector representation for each field that corresponds to one of the aforementioned subspaces. As one illustrative approach in these regards, and again without intending to suggest any particular limitations in these regards, this activity can comprise first identifying kernel points within each of the subspaces. This process 200 can then provide for calculating field values at positions defined by the kernel points for each subspace and combining those field values to generate descriptors for each of the subspaces. Those descriptors for each of the subspaces can then be provided to a machine learning model trained as a local field embedder that outputs corresponding fixed-length vectors of real numbers that comprise the fixed-dimensionality vector representation for each field that corresponds to one of the subspaces.

At block 203, this process 200 provides for inputting the three-dimensionality vector representations and query point coordinates corresponding to each of the subspaces into a field estimator neural network trained to output corresponding field values. By one approach, that field estimator neural network and comprise an encoder-decoder machine learning model. In such a case, the encoder portion of the encoder-decoder machine learning model can be configured to learn representations of field variation specifics within a subspace and a decoder portion of the encoder-decoder machine learning model can be configured to estimate field values at each of a plurality of corresponding ordinate points.

By one approach, the aforementioned field values can comprise signed distance fields as are known in the art. A signed distance function is known to comprise a continuous function that, for a given point in space, returns the point's distance to a closest surface with a corresponding sign. The sign may be negative when the point is inside of the closest surface and positive when the point is outside of the surface.

Generally speaking, these teachings support fast compression of arbitrary scalar or vector fields into a compact representation. These teachings provide for subdividing an original space, upon which the foregoing field is defined, into a set of maximally informative subspaces. By one approach, one such metric may correspond to the non-uniformity of directions of the field's gradient. These teachings then provide for using neural networks to form a fixed-dimensionality vector representation of a subspace's field. This representation can be continuous and allow obtaining a value by querying any point in the subspace with granularity limited only by float precision. So configured, the subspaces can be combined in a way that makes it possible to query relevant information in the entire parent space.

These teachings can be beneficially employed in a variety of application settings. Examples include, but are not limited to, three-dimensional model representation, rendering, lighting, and approximation of three-dimensional point-to-object interactions through an approximation of a three-dimensional model's signed distance field. Unlike many prior art approaches, these teachings permit a one-shot (i.e., with no additional optimization required) conversion of a watertight three-dimensional mesh into neural signed distance field representations. The latter, in turn, makes physical interaction computations and many global illumination routines more efficient on general-purpose hardware. This can be beneficial in game engines, physical simulations, and virtual reality experiences.

By way of comparison, only one query (requiring approximately 0.00046 ms) was required to check collisions for a 10K triangle mesh (without optimizations) while other prior art approaches, using the same computing platform, required more on the order of 10K queries (using approximately 0.41 ms). As for memory consumption (and without optimizations), these teachings consumed approximately 68 kilobytes per model while prior art approaches consumed at least 5 megabytes and sometimes as much as 500 megabytes or more.

Additional details in these regards will now be presented. These details pertain to useful approaches to spatial decomposing routines. It should be understood that these specific details are intended to serve an illustrative purpose and are not intended to suggest any limitations as regards these teachings.

Figure 4:
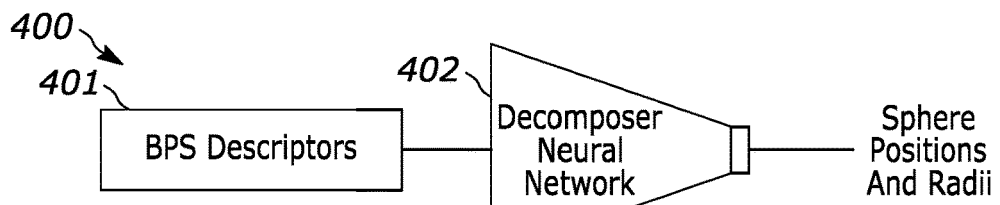
FIG. 4 comprises a block diagram as configured in accordance with various embodiments of these teachings.

Referring to FIG. 4, a spatial decomposer inference pipeline 400 presumes the construction of a fixed set of points referred to herein as a basis point set (BPS). These teachings will accommodate various approaches in these regards, and the basis point set may correspond to a cubic grid, a hexagonal close packed grid, or any other meaningful set of points. (In some cases, the points that form the basis point set may be referred to as nodes.) Descriptors 401 are formed for each point in the basis point set. For example, the descriptors may be distance/vectors from the node to a closest mesh vertex or a point in a point cloud sampled on the mesh surface. Other descriptive features of the node may include such things as the field's value or the field's gradient (if the field is differentiable).

These descriptors 401 are input to a decomposer neural network 402. The latter outputs corresponding subspace parameters such as center positions and radii of predicted spheres. These teachings will accommodate controlling the number of predicted subspaces. For example, the working presumption may be that there is one subspace per each point in the basis point set or, in the alternative, that there is only a predefined number of subspaces (in which case there would not likely be any straightforward correspondence with points in the basis point set).

Calculating corresponding error can be accomplished in at least one of two ways. By one approach, one can evaluate the cost of minimal assignment of predicted spheres to ground-truth spheres. In particular, one can calculate the error as the weighted sum of Lp distances between centers combined with Lp norms of radii differences. (Lp spaces (sometimes called Lebesgue spaces) are function spaces defined using a natural generalization of the p-norm for finite-dimensional vector spaces.) By another approach, in the case of mesh-induced signed distance fields and spheres as subspaces, one can calculate the signed distance field generated by the union of predicted spheres, and the error can be defined as the mean absolute difference between the ground truth signed distance field and the sphere union signed distance field (or any other appropriate meaningful loss function).

Error gradients can be utilized to update decomposer parameters if desired.

Figure 5:
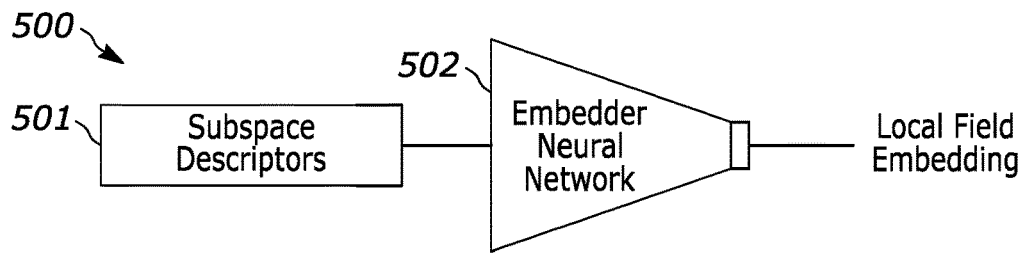
FIG. 5 comprises a block diagram as configured in accordance with various embodiments of these teachings.
Figure 6:
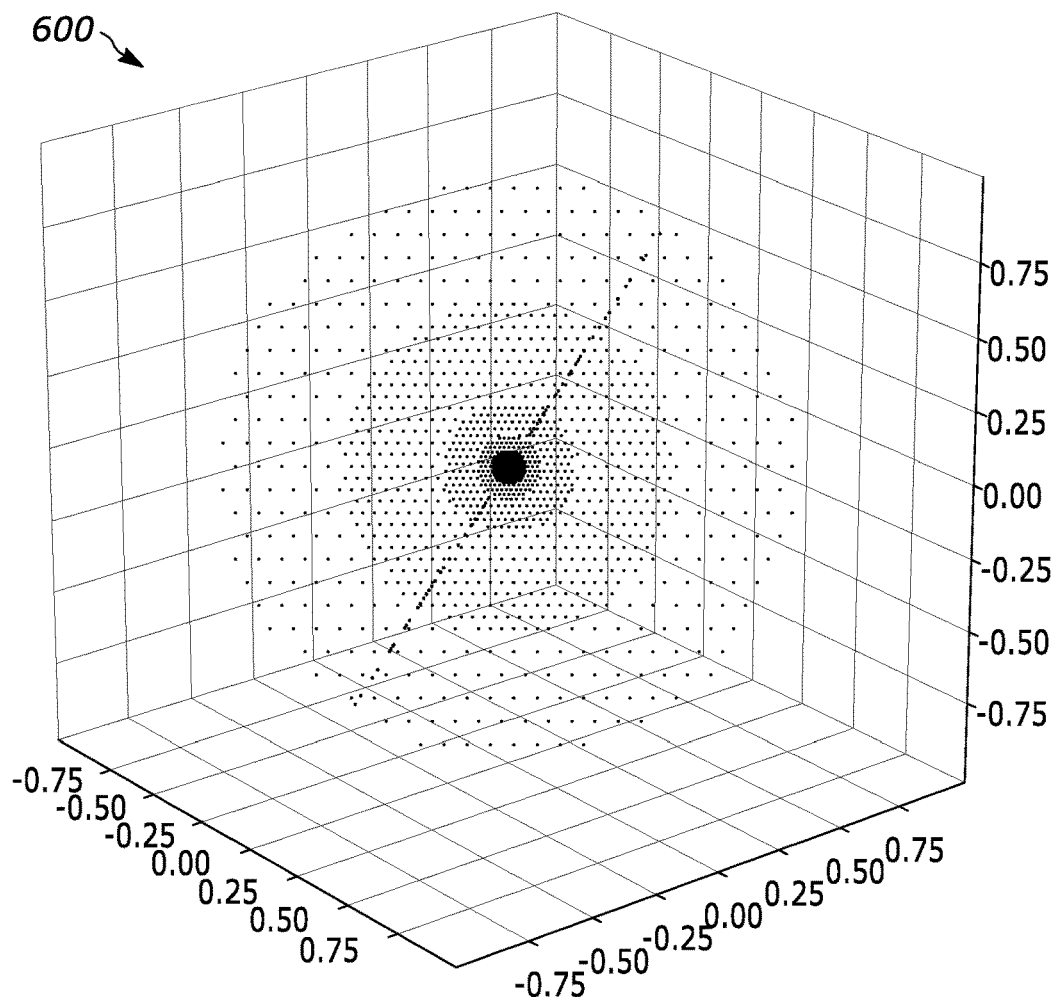
FIG. 6 comprises a graphic depiction as configured in accordance with various embodiments of these teachings.

Referring now to FIG. 5, an approach to a local field embedder will be described. These teachings provide for positioning a kernel inside each of the aforementioned subspaces. Referring to FIG. 6, this results in a crafted set of points 600. In particular, this can comprise taking scale into account to fit each kernel appropriately into a corresponding subspace. By one approach, one then calculates the field values and corresponding gradients (when the field is differentiable) at all positions defined by the aforementioned kernel points of each subspace. Those values are then combined to obtain each subspace's descriptor 501. An embedder neural network 502 receives those subspace descriptors 501 and outputs corresponding local field embeddings as fixed-length vectors of real numbers.

These teachings will then accommodate sampling a set of points. By one approach, this can comprise sampling a number of points inside each subspace. By another approach, and particularly in the case of using mesh-induced signed distance fields, this can comprise sampling a number of points in a unit cube, having a predefined ratio of such points located in a small neighborhood near the mesh surface. One can then recalculate the coordinates of these points to be in each subspace's local coordinate system. Either way, each subspace has it own set of sampled points defined, at least in part, by local coordinates corresponding to that subspace.

Generally speaking, those coordinates and local field embeddings are then passed to a field estimator as described below and estimates of field values at these points then gathered. A loss function can be calculated as the power mean of the Lp norm of the difference between predicted and ground truth field values (and, optionally, any corresponding gradients).

Figure 7:
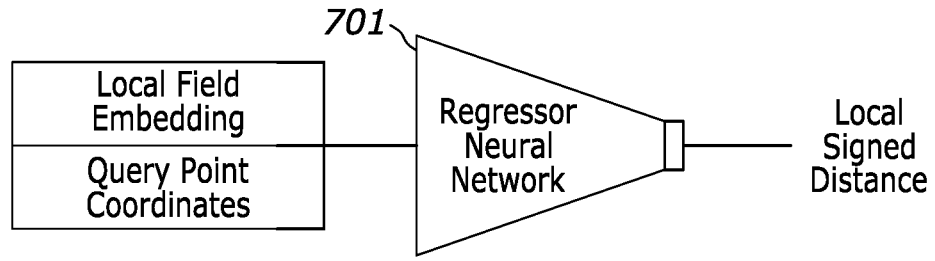
FIG. 7 comprises a block diagram as configured in accordance with various embodiments of the invention.

These teachings will accommodate a variety of different field estimator approaches. Via a first approach, and referring to FIG. 7, the aforementioned local field embedding information and corresponding query point coordinates are input to a simple feed-forward regressor machine learning neural network 701 that predicts the field's value (in this example, as a local signed distance).

Figure 8:
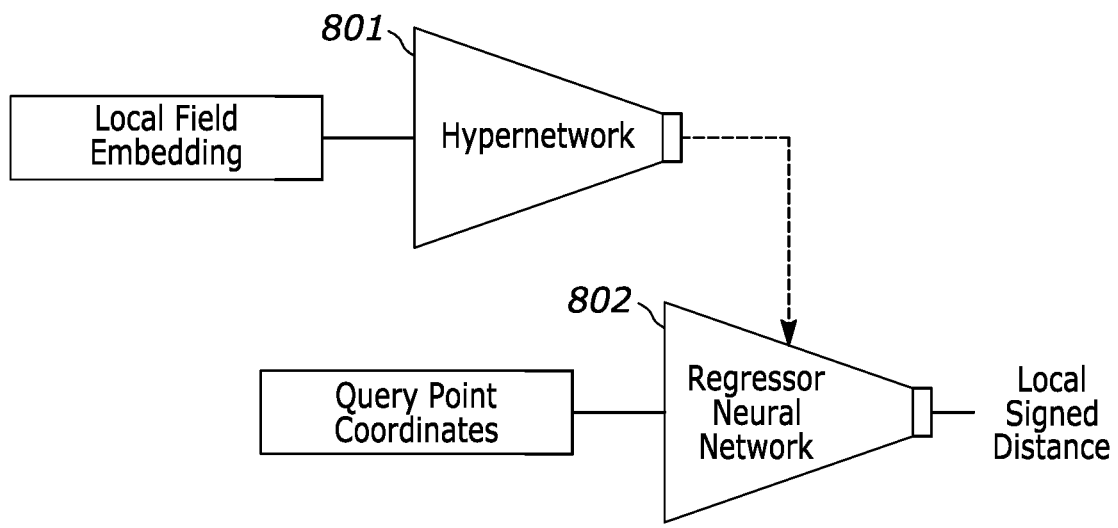
FIG. 8 comprises a block diagram as configured in accordance with various embodiments of these teachings.

By another approach, and referring to FIG. 8, the aforementioned local field embedding information first passes through a hypernetwork 801 to generate field regressor parameters. The latter then serves to construct a regressor neural network 802 having a predefined architecture that takes a query point and produces a local signed distance value (in this example) out this point as output.

Figure 9:
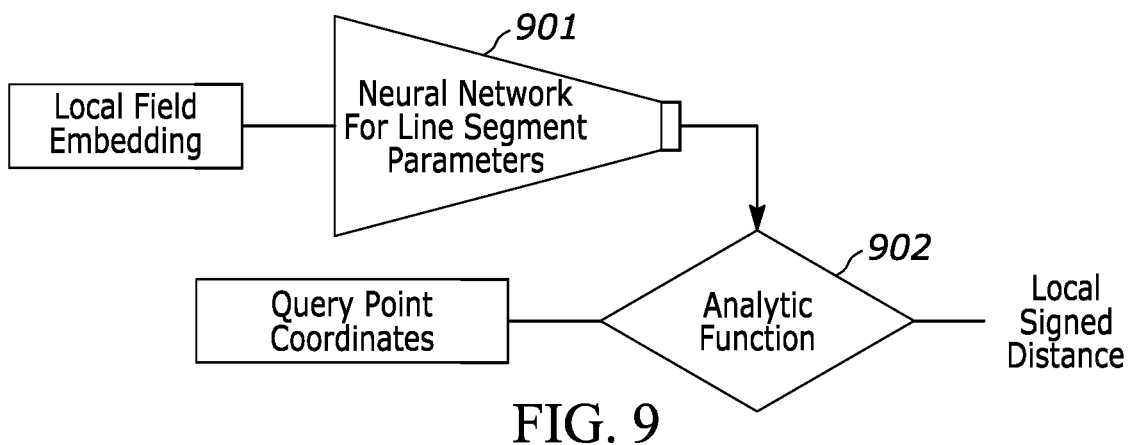
FIG. 9 comprises a block diagram as configured in accordance with various embodiments of the invention.

By yet another approach, and referring to FIG. 9, the aforementioned local field embedding information is input to a small neural network 901 that predicts the parameters of line segments. Those resultant line segment parameters are then passed along with the aforementioned query point coordinates to an analytic function 902. The latter again outputs the predicted information (in this case, local signed distance information). For example, point coordinates can be mapped into local coordinates of a line segment (for example, cylindrical or a mix of cylindrical and spherical at the ends of a segment) and the analytical function may be any (parameterized) function that uses those coordinates to derive local field values. This variant may be particularly useful when modelling the signed distance function of some piecewise-rigid object, such as an animable model of the human body.

Figure 10:
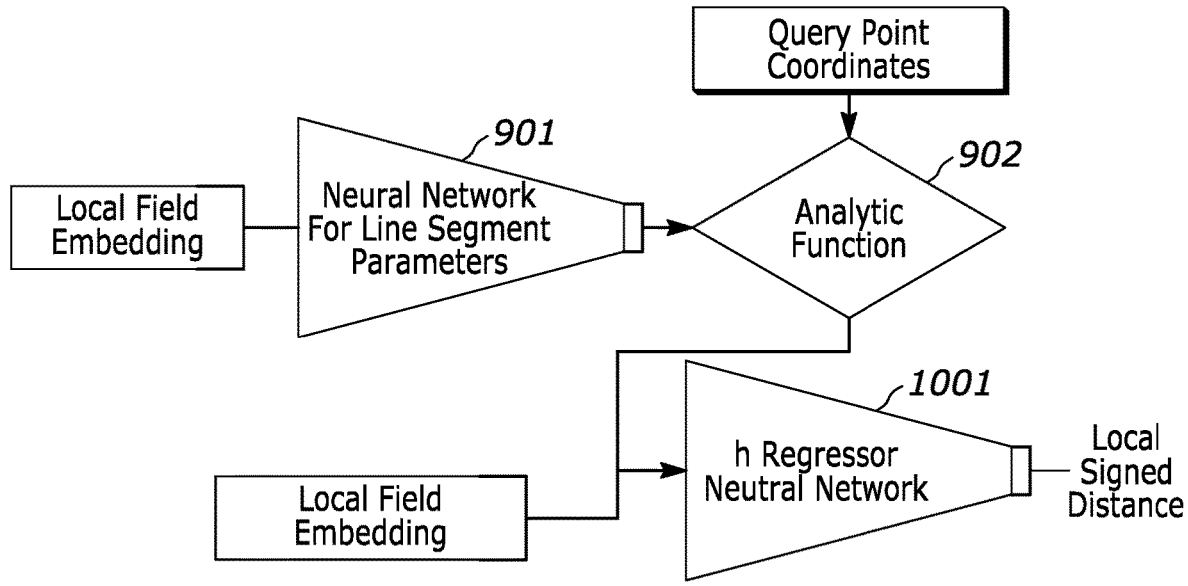
FIG. 10 comprises a block diagram as configured in accordance with various embodiments of these teachings.

By yet another approach, and referring to FIG. 10, the local field embeddings information is again input to a neural network 901 that predicts the parameters of several line segments and the latter is input to an analytic function that again receives the query point coordinates. In this example, however, the output of the analytic function 902 is input to an h regressor machine learning program 1001 along with the local field embedding information. (Those skilled in the art will understand that the expression "h regressor" refers to a regressor network that is parameterized by a hypernetwork.) The outputs of the machine learning model are gathered with respect to each of the line segments to calculate the final output (i.e., the field value predicted at a query point) as a combination of those outputs.

Figure 11:
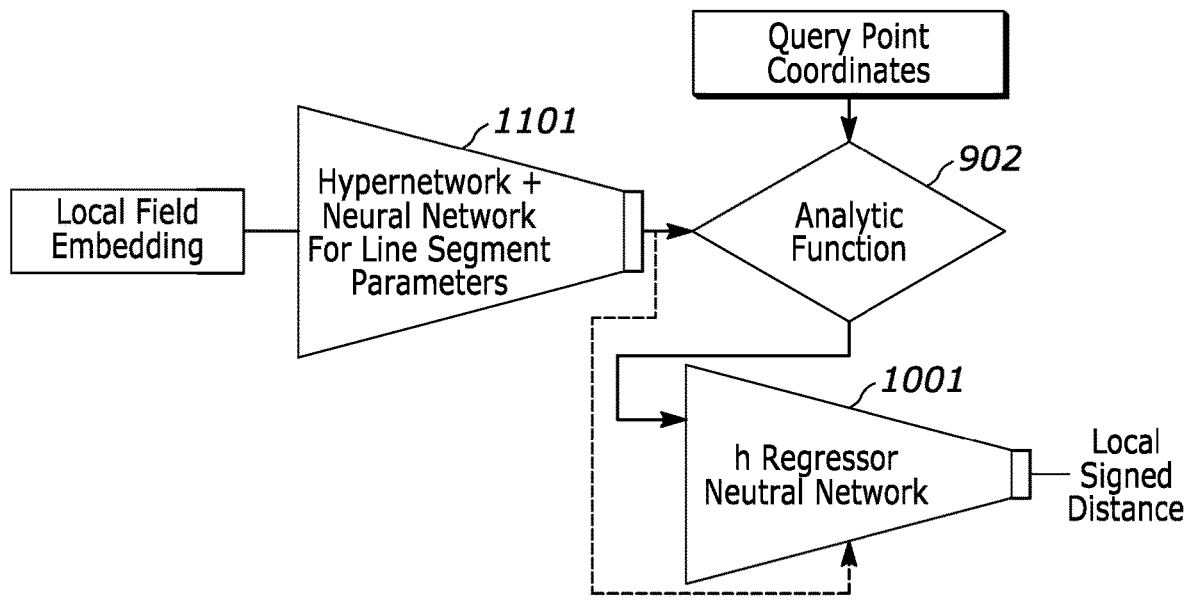
FIG. 11 comprises a block diagram as configured in accordance with various embodiments of these teachings.

And by yet another approach, and referring to FIG. 11, an element 1100 comprises a small neural network that predicts the parameters of corresponding line segments, and that further includes a hypernetwork configured to receive the local field embeddings as input and that serves to predict weights for the aforementioned small neural network. An analytic function 902 receives resultant line segment parameters along with corresponding query point coordinates and provides the corresponding output to an h regressor neural network 1001, the latter having its weights constructed from the outputs of the aforementioned hypernetwork. The outputs of the h regressor neural network 1001 are gathered with respect to each of the line segments and corresponding predicted field values are output for given query points as a combination of those outputs.

[Vlad—please feel free to add any additional details regarding anything else, or to add alternative ideas, here]

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method to compress source field information having a corresponding initial space for a given object into a corresponding compact representation, the method comprising:

by a control circuit:
subdividing the initial space into a plurality of subspaces;
generating a fixed-dimensionality vector representation for each field that corresponds to one of the subspaces;
inputting the fixed-dimensionality vector representations and query point coordinates corresponding to each of the subspaces to a field estimator neural network trained to output corresponding field values.

2. The method of claim 1, wherein the source field information comprises at least one of a scalar field and a vector field.

3. The method of claim 1, wherein the source field information comprises a three-dimensional object represented as a two-dimensional manifold embedded in Euclidean three-dimensional space approximated via polygon mesh.

4. The method of claim 1, wherein the subspaces comprise geometric primitives.

5. The method of claim 1, wherein subdividing the initial space into a plurality of subspaces comprises:

generating a point set comprising a fixed set of points;
generating at least one descriptor for each of the points;
providing the descriptors as input to a machine learning model trained as at least one of a spatial decomposer and an analytic algorithm that outputs corresponding subspace parameters corresponding to the plurality of subspaces.

6. The method of claim 5, wherein the subspace parameters include center positions and defining parameters of corresponding subspaces represented by geometric primitives.

7. The method of claim 1, wherein generating a fixed-dimensionality vector representation for each field that corresponds to one of the subspaces comprises:
identifying kernel points within each of the subspaces;
calculating field values at positions defined by the kernel points for each subspace and combining those field values to generate descriptors for each of the subspaces;
providing the descriptors for each of the subspaces as input to a machine learning model trained as a local field embedder that outputs corresponding fixed-length vectors of real numbers that comprise the fixed-dimensionality vector representation for each field that corresponds to one of the subspaces.

8. The method of claim 1, wherein the field estimator neural network comprises an encoder-decoder machine learning model.

9. The method of claim 8, wherein an encoder portion of the encoder-decoder machine learning model learns representations of field variation specifics within a subspace and a decoder portion of the encoder-decoder machine learning model estimates fields values at each of a plurality of corresponding coordinate points.

10. An apparatus to compress source field information having a corresponding initial space for a given object into a corresponding compact representation, the apparatus comprising:
a control circuit configured to:
subdivide the initial space into a plurality of subspaces;
generate a fixed-dimensionality vector representation for each field that corresponds to one of the subspaces;
input the fixed-dimensionality vector representations and query point coordinates corresponding to each of the subspaces to a field estimator neural network model trained to output corresponding field values.

11. The apparatus of claim 10, wherein the source field information comprises at least one of a scalar field and a vector field.

12. The apparatus of claim 10, wherein the source field information comprises a three-dimensional object represented as a two-dimensional manifold embedded in Euclidean three-dimensional space approximated via polygon mesh.

13. The apparatus of claim 10, wherein the subspaces comprise geometric primitives.

14. The apparatus of claim 10, wherein the control circuit is configured to subdivide the initial space into a plurality of subspaces by:
generating a point set comprising a fixed set of points;
generating at least one descriptor for each of the points;
providing the descriptors as input to a machine learning model trained as at least one of a spatial decomposer and an analytic algorithm that outputs corresponding subspace parameters corresponding to the plurality of subspaces.

15. The apparatus of claim 14, wherein the subspace parameters include center positions and defining parameters of corresponding subspaces represented by geometric primitives.

16. The apparatus of claim 10, wherein the control circuit is configured to generate a fixed-dimensionality vector representation for each field that corresponds to one of the subspaces by:
identifying kernel points within each of the subspaces;
calculating field values at positions defined by the kernel points for each subspace and combining those field values to generate descriptors for each of the subspaces;
providing the descriptors for each of the subspaces as input to a machine learning model trained as a local field embedder that outputs corresponding fixed-length vectors of real numbers that comprise the fixed-dimensionality vector representation for each field that corresponds to one of the subspaces.

17. The apparatus of claim 10, wherein the field estimator neural network comprises an encoder-decoder machine learning model.

18. The apparatus of claim 17, wherein an encoder portion of the encoder-decoder machine learning model learns representations of field variation specifics within a subspace and a decoder portion of the encoder-decoder machine learning model estimates fields values at each of a plurality of corresponding coordinate points.

* * * * *